US006814665B2

(12) United States Patent
Seelig et al.

(10) Patent No.: US 6,814,665 B2
(45) Date of Patent: Nov. 9, 2004

(54) GAMING BONUS DEVICE AND METHOD OF USE

(75) Inventors: Jerald C. Seelig, Absecon, NJ (US); Lawrence M. Henshaw, Hammonton, NJ (US); Mac Seelig, Absecon, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 0 days.

(21) Appl. No.: 09/967,055

(22) Filed: Sep. 28, 2001

(65) Prior Publication Data

US 2002/0107066 A1 Aug. 8, 2002

Related U.S. Application Data

(60) Provisional application No. 60/241,384, filed on Oct. 17, 2000.

(51) Int. Cl.[7] .................................................. A63F 13/00

(52) U.S. Cl. ............................. 463/25; 463/10; 463/16; 463/17; 463/20

(58) Field of Search ......................... 463/16–22, 24–27; 273/143 R

(56) References Cited

U.S. PATENT DOCUMENTS 4,695,053 A 9/1987 Vazquez, Jr. et al.
5,154,420 A * 10/1992 Gutknecht .............. 273/138 A
5,848,932 A * 12/1998 Adams ......................... 463/20
6,059,289 A * 5/2000 Vancura .................. 273/143 R
6,173,955 B1 * 1/2001 Perrie et al. ................ 273/146
6,234,897 B1 * 5/2001 Frohm et al. ................. 463/20
6,315,664 B1 * 11/2001 Baerlocher et al. ........... 463/21

FOREIGN PATENT DOCUMENTS

EP 0 050 419 A1 * 4/1982 ........... G07F/17/34
GB 2 169 737 A * 7/1986 ........... G07F/17/34
GB 2 210 191 A * 6/1989 ........... G07F/17/34

* cited by examiner

*Primary Examiner*—Jessica Harrison
*Assistant Examiner*—Robert E. Mosser
(74) *Attorney, Agent, or Firm*—Ian F. Burns

(57) ABSTRACT

A gaming bonus device and method of use in a gaming system. A game player is allowed to play a game for a prize on a primary game. The primary game generates a bonus-qualifying event. The bonus game, in response to the bonus-qualifying event, generates and displays three either/or binary outcomes entitling a player to a predefined payout. The game player can be allowed to select the winning outcome. The payout depends upon the number of similar binary outcomes displayed as compared to the selected winning outcome.

40 Claims, 9 Drawing Sheets

GAMING BONUS DEVICE AND METHOD OF USE

CROSS REFERENCES TO RELATED AND CO-PENDING APPLICATIONS

This application claims priority to U.S. provisional patent application Ser. No. 60/241,384, filed Oct. 17, 2000 and entitled, “Gaming Bonus Device and Method of Use,” the contents of which are herein incorporated by reference.

BACKGROUND OF THE INVENTION

1. Field of Invention

The present invention relates to gaming devices and method of using the same. In particular, it relates to a device for displaying a bonus.

2. Description of Related Art

Various bonus systems for use with gaming devices are known in the field of gaming. U.S. Pat. No. 6,059,289, issued to Vancara, discloses a method for playing a bonus game in a secondary slot machine adjacent to a primary slot machine. The primary slot machine issues a bonus-qualifying signal to the secondary slot machine to start play of a bonus game when a bonus qualifying event occurs. After the random spin on the secondary slot machine, the values or value play symbols are accumulated into an accumulated winning value until the end of the bonus game occurs. U.S. Pat. Nos. 5,823,874 and 5,848,932, issued to Adams disclose slot casino games incorporating a single play bonusing feature where a rotating wheel is activated by the player depressing a bonus spin button when certain indicia appear on the reels of a slot game. U.S. Pat. No. 5,393,057, issued to Marnell II, discloses an electronic gaming apparatus and method therefore wherein each play in the bonus is the result of successive underlying game play.

Players of gaming apparatus typically find it enjoyable to have a variety of different forms of gaming apparatus available. Gaming machines that are more interesting generate more player excitement and in turn are played longer resulting in more revenue for the game operator. In addition, games that are more visually appealing generate more player interest. Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

Display devices tend to be more successful if they utilize physical objects rather than simulations. Although video devices and electronic signs can be used for display devices, players are more attracted to display devices that utilize physical objects. Physical objects can be even more effective display devices if they are moveable and they are used in combination with lights and sounds.

Unfortunately, the similarity of gaming machines poses a problem for gaming machine manufacturers in differentiating their machines from competitors. Adding a bonus game to a base game can add differentiation to the game and add more variety to the game.

A current unmet need exists for a bonus gaming device that provides game players with a more exciting and desirable gaming experience and that is visually appealing.

An unmet need exists for a bonus gaming device that is enjoyable to play and results in longer play times and revenues for the gaming operator.

SUMMARY OF THE INVENTION

Advantages of the Invention

An advantage of the present invention is that it provides a bonus gaming device that adds to player excitement and satisfaction.

Another advantage of the present invention is that it provides a bonus gaming device that is visually appealing.

A further advantage of the present invention is that it provides a method of playing a bonus game that holds and attracts player interest.

An additional advantage of the present invention is that it provides a bonus gaming device that is easily added to a primary game.

An additional advantage of the present invention is that it provides a bonus gaming device that is readily understood by players and yet is interesting.

A further advantage of the present invention is that it provides a bonus gaming device that includes a bonus multiplier to increase the bonus.

An additional advantage of the present invention is that it provides a bonus gaming device that allows the game player to select the winning outcome.

These and other advantages of the present invention may be realized by reference to the remaining portions of the specification, claims, and abstract.

BRIEF DESCRIPTION OF THE INVENTION

The present invention comprises a gaming bonus device for use in a gaming system including a primary gaming device that generates a bonus-qualifying event. A bonus game acts in response to the bonus-qualifying event. The bonus game generates and displays one or more binary symbol outcomes entitling a player to a predefined payout issued to a player when the player wins depending upon the number of similar binary symbol outcomes displayed. The binary symbols are three spinning coins, each having a head and a tail side, which are associated with the primary gaming device and are selectively spun and shown. A multiplier random number generator is associated with the bonus game and automatically selects a multiplier for the payout issued to a player when the player wins. The player can be allowed to select a winning outcome.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

Figure 1:
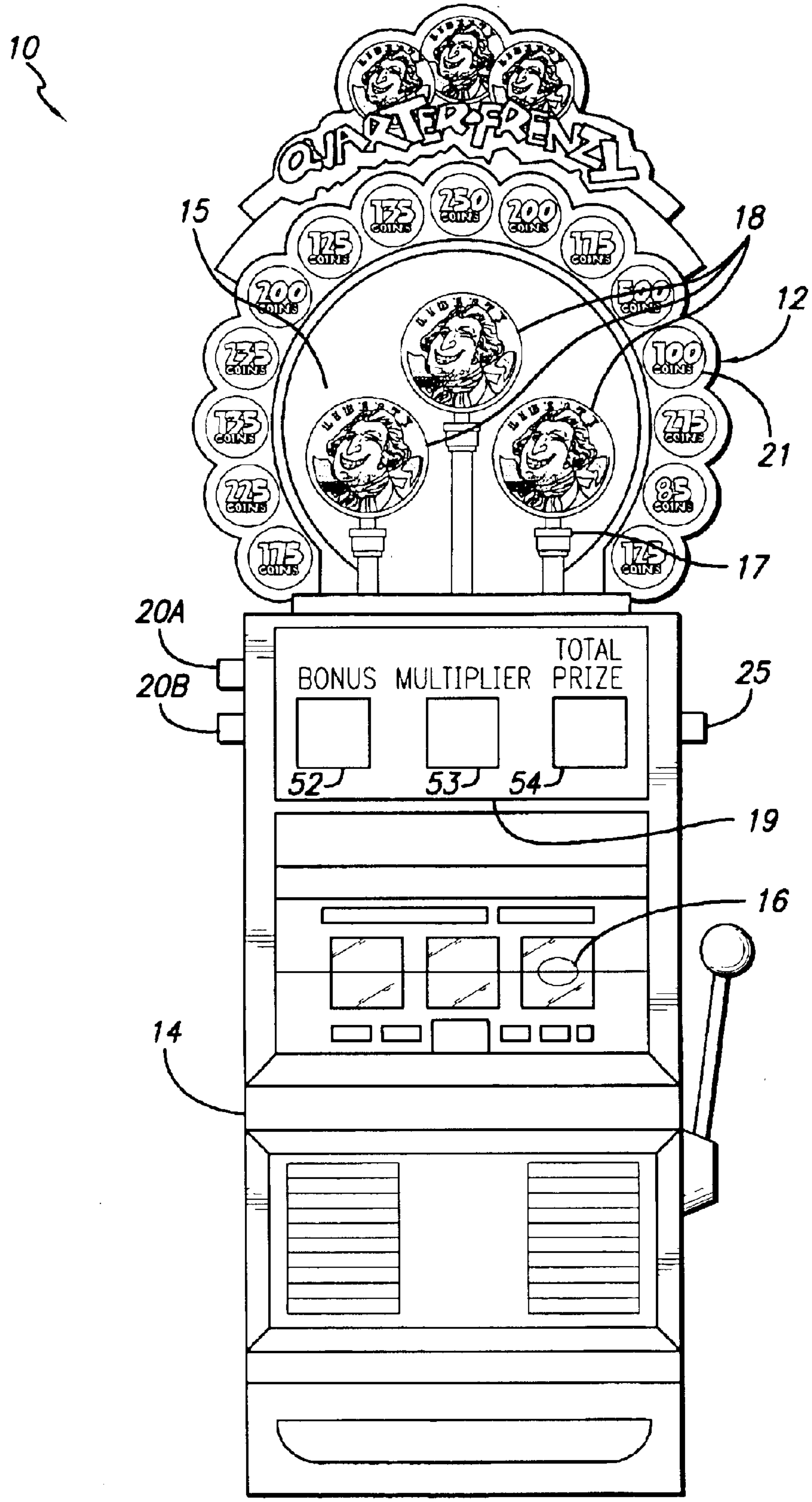
FIG. 1 is substantially a preferred embodiment of a bonus gaming device.

FIG. 1 is a preferred embodiment of the gaming device 10. It has a primary gaming device 14 shown as an electronic slot machine. Gaming device 14 generates a bonus-qualifying event on the reel strip 16 of the slot machine. The bonus event can be almost any predetermined event and can be internal or external to the game. A bonus game 12 is mounted on top of the primary gaming device 14 and acts in response to the bonus-qualifying event. The bonus game can be a random binary generator. The bonus game 12 randomly spins and displays three binary outcomes. The binary outcomes can be quarters 18 to give a heads or tails outcome. Other binary outcomes are possible to use such as Xs or Os, colors or shapes. Bonus game 12 can select the winning outcome or the player may be allowed to select the winning outcome. The bonus game entitles a player to a predefined payout when the player wins depending upon the number of similar heads or tails to the winning outcome. The quarters 18 are shown on a display 15.

Figure 2:
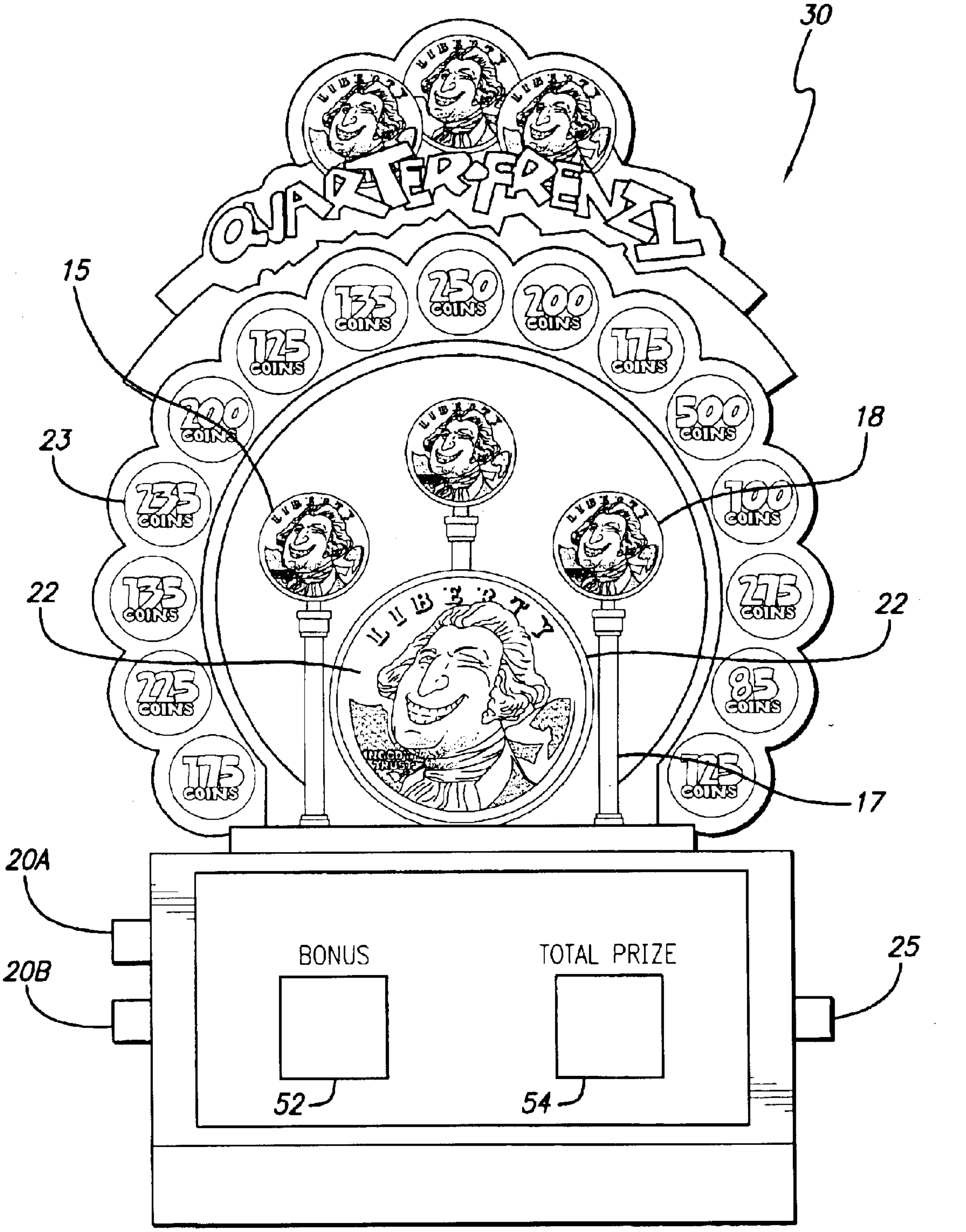
FIG. 2 is substantially an exploded view of the bonus gaming device of FIG. 1.

The three spinning coins 18, each having a head and a tail face, are mounted on top of and associated with the slot machine 14 and selectively spun. The coins 18 are mounted above poles 17 and could be spun by an attached electric motor or solenoid. When the bonus-qualifying event occurs on the slot machine reel 16, the bonus game is activated. A patron then presses either a "heads" button 20A or a "tails" button 20B, located on the bonus game 12 in order to select the winning outcome. Thereafter, the three (3) coins 18 in the bonus game 12 will begin to spin. Depending upon the number of heads vs. tails and the patron's selection, the patron is entitled to a base award. The award is displayed on win meter 19. For example, if the patron selects heads and of the three (3) coins spinning in the top box, two (2) of them are displaying heads, the patron will be entitled to a bonus award of 25 coins as shown in FIG. 2 of the attached drawings. While, three coins 18 were shown, the game could also be played with 1, 2 or more than three coins 18. For example, if the game were played with one coin, the player would win a pre-defined bonus if his selection of heads or tails matched that displayed by coin 18.

The outcomes are combinations of heads or tails, odds or evens, "Xs" or "Os," different colors or geometric shapes, entitling a player to a predefined payout when the player wins depending upon the number of similar binary outcomes elected and displayed. Although the following discussion focuses on coins with head and tail outcomes, any binary outcome either/or symbols, colors, or shapes could be used instead, depending upon the theme desired.

If the game player does not press button 20A or 20B, the quarters will automatically spin after a period of time and the bonus game will select the winning outcome. The bonus game may also include a delay-activated switch 25, which allows a player the opportunity to activate the bonus game 12 before it is automatically activated.

The bonus is shown on a bonus meter 52.

An optional feature of the gaming bonus device includes a multiplier random generator (not shown) associated with the bonus game 12, which automatically selects a multiplier for the payout issued to a player when the player wins. Once the coins stop spinning and the patron's base award is displayed, a random number generator automatically selects the multiplier by which the base bonus will be multiplied to determine the bonus to be awarded to the patron. For instance, if the patron receives two (2) heads, this would entitle the player to a base award of 25 coins. If the 4X multiplier bonus indicator 21 lights up as shown in FIG. 1, the game player is awarded a total prize of 100 coins, which would be displayed on the win meter embodiment shown in FIG. 3. Several bonus multiplier indicator lights 21 are mounted around display 15 of gaming device 10 and light up to show the multiplier amount that is generated by the multiplier random number generator. The multiplier can be indicated on a multiplier meter 53 and the total prize won on total prize meter 54. If the selected multiplier is zero, a consolation prize can be awarded. Playing for the multiplier may also be repeated a number of times.

FIG. 2 shows another embodiment of the invention in bonus game 30. FIG. 2 is similar to FIG. 1, except the multiplier bonus lights 21 are replaced by extra coin indicator lights 23. Instead of awarding a multiplier bonus, a pro determined amount of extra coins are awarded as an extra bonus to the game player. Indicator lights 23 light up to show the winning amount of extra coins. The gaming bonus device 30 may include a changing sign display 22 having a similar theme, such as a large changing face Quarter, to entertain the player during the game.

Figure 3:
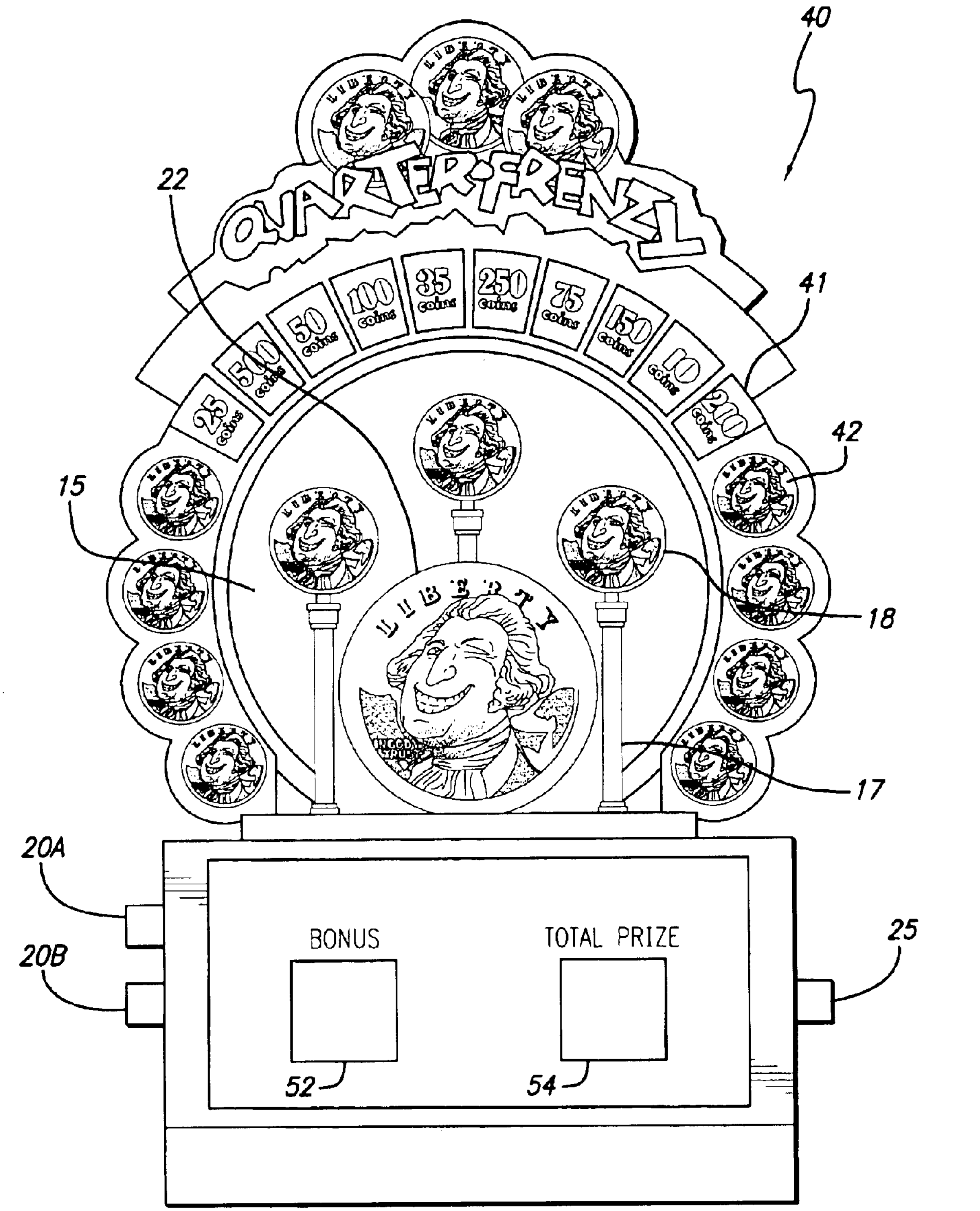
FIG. 3 is substantially another preferred embodiment of the bonus gaming device.

Turning now to FIG. 3, another embodiment of the bonus game is shown. Bonus game 40 is similar to FIG. 2, except that fewer payout possibilities 41 are shown and the payout possibilities are shown inside a square shape instead of a circle shape. Decorative quarters 42 are also added around the periphery of the game to provide a more attractive display.

Figure 4:
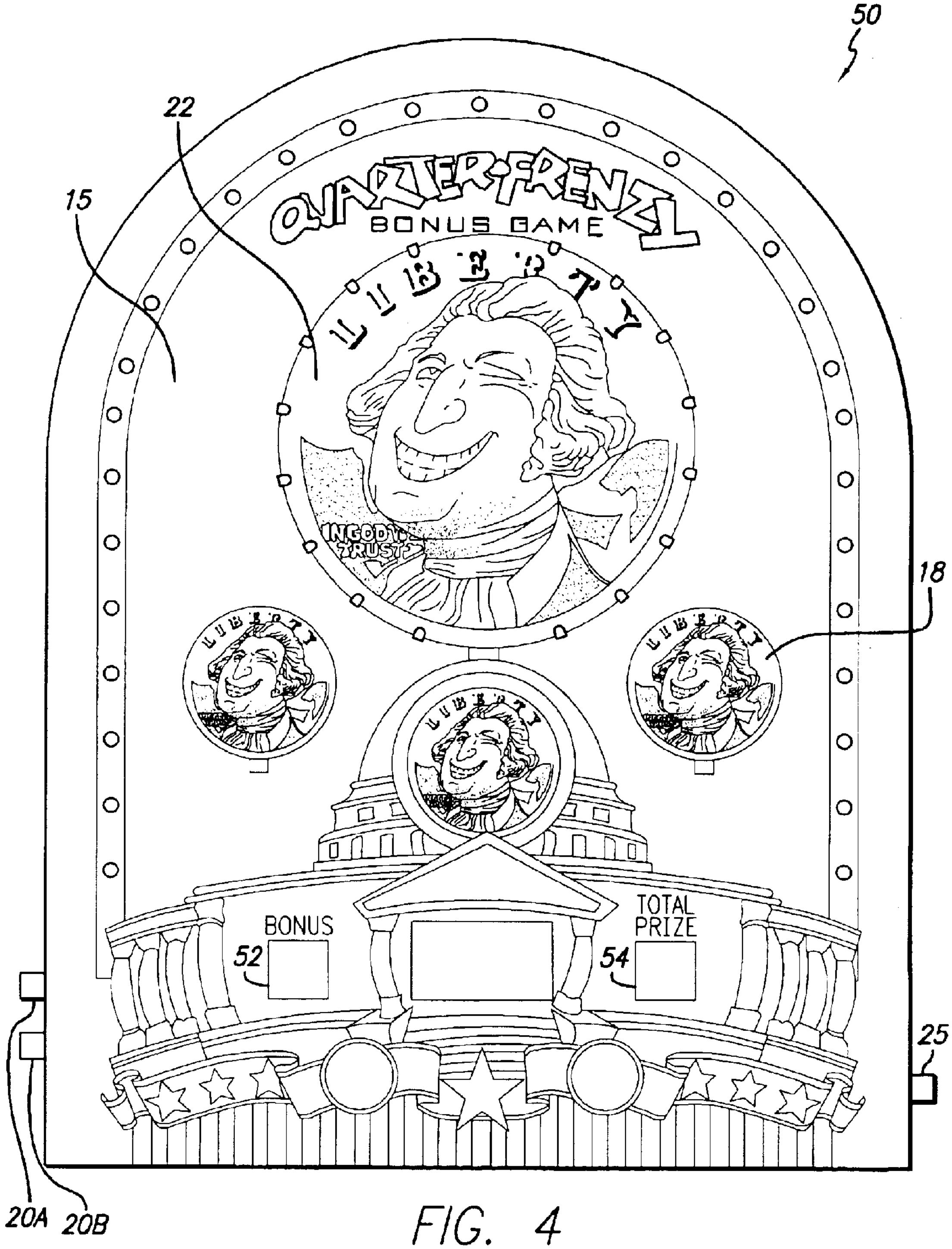
FIG. 4 is substantially another preferred embodiment of the bonus gaming device.

Turning now to FIG. 4, another embodiment of the bonus game is shown. Bonus game 50 is similar to FIG. 2, except the multiplier payout possibilities are not shown. In bonus game 50, the spinning coins 18 are located below the changing sign display 22.

The gaming bonus device may employ either mechanical or electrical secondary binary outcome random number generators, or a combination thereof, which generate three bi-modal displays. While the bonus game embodiments have been shown using physical coins that are spun. The bonus game could also be implemented using a video screen.

A controller would drive the video screen to selectively show, spin and stop the three spinning coins. Other binary symbols could also be displayed on the video screen such as colors or Xs and Os.

Figure 5:
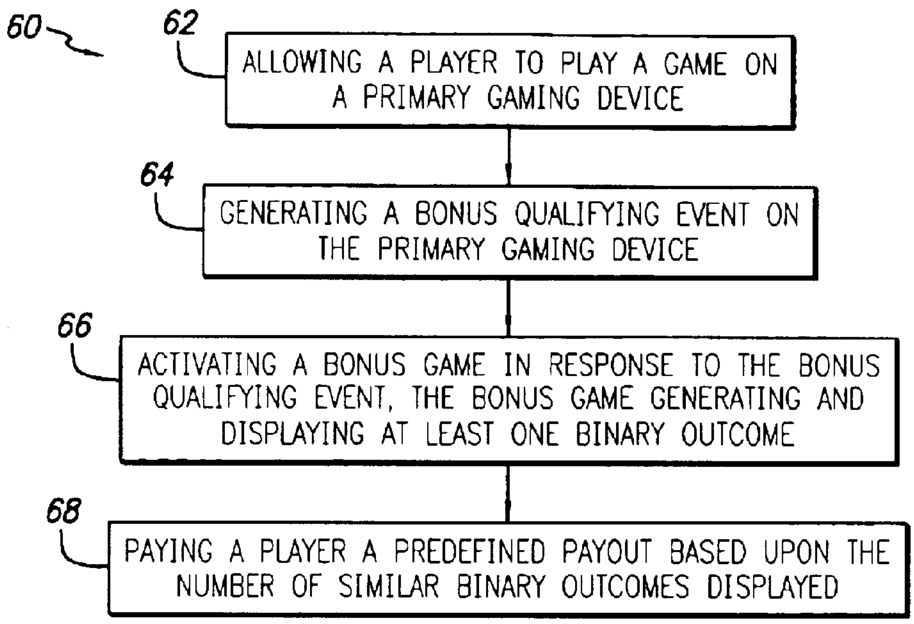
FIG. 5 is substantially a schematic flow diagram of a bonus gaming method.

Referring to FIG. 5, a schematic flow diagram 60 of the bonus gaming method of the present invention is shown. The method entails allowing a player to play a game on a primary gaming device at step 62. During the play of the game, a bonus-qualifying event may occur at step 64. A bonus game 12 is then activated in response to the bonus signal to generate and display at least one binary outcome at step 66. Bonus game 12 also selects a winning outcome. The player is then paid a predefined payout when the player wins depending upon the number of similar binary outcomes to the winning outcome displayed at step 68.

Figure 6:
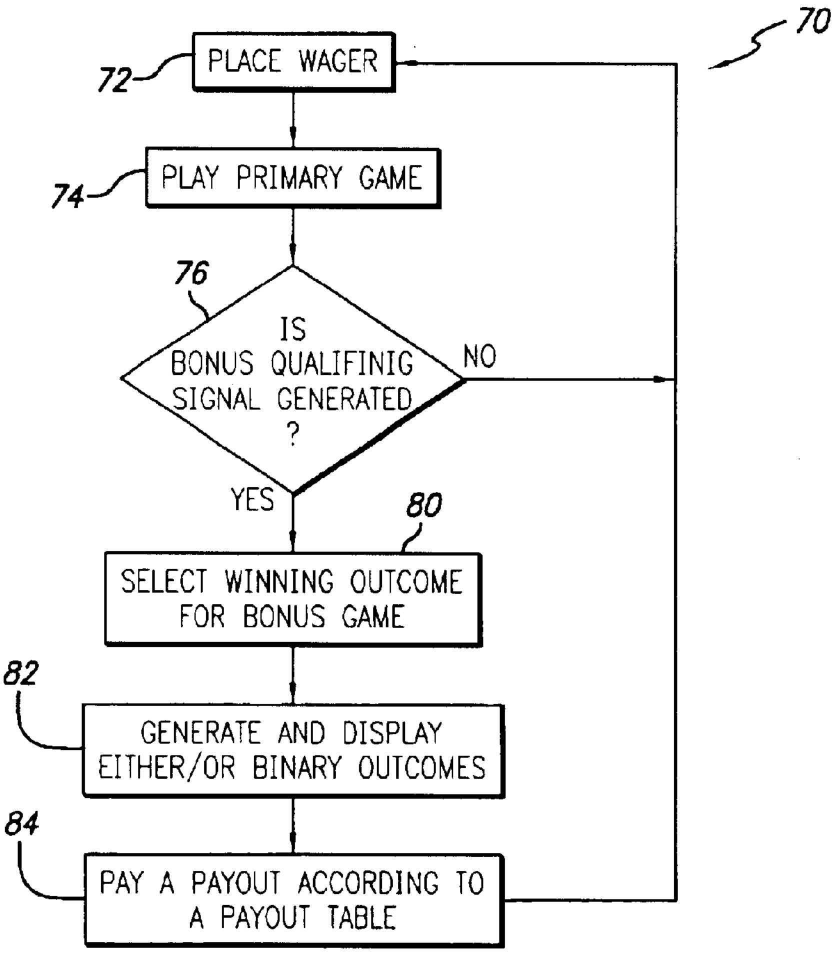
FIG. 6 is substantially a detailed flowchart of the bonus gaming method.

Referring to FIG. 6, a detailed flowchart 70 of a bonus gaming method is shown. A game player initiates game play at step 72 by depositing coins or tokens into primary game 14. The game player plays a game on the primary game at step 74. The primary game 14 generates a bonus-qualifying event 16. At decision step 76, the game checks to see if the bonus-qualifying event or signal has occurred. If the bonus-qualifying event has not occurred, the game loops back to step 72 to allow the player the opportunity to place another wager and play the primary game again. If the bonus-qualifying event has occurred at step 76, the game proceeds to step 80. At step 80, the player is queried to select one of the either/or binary outcomes such as heads or tails. Next, at step 82, bonus game 12 is then activated to generate and display the three either/or binary heads or tails outcomes. Next, at step 84, the game player is paid a predefined payout depending upon the number of similar binary outcomes displayed to the selected binary outcome, which would be referenced in a payout table.

Figure 7:
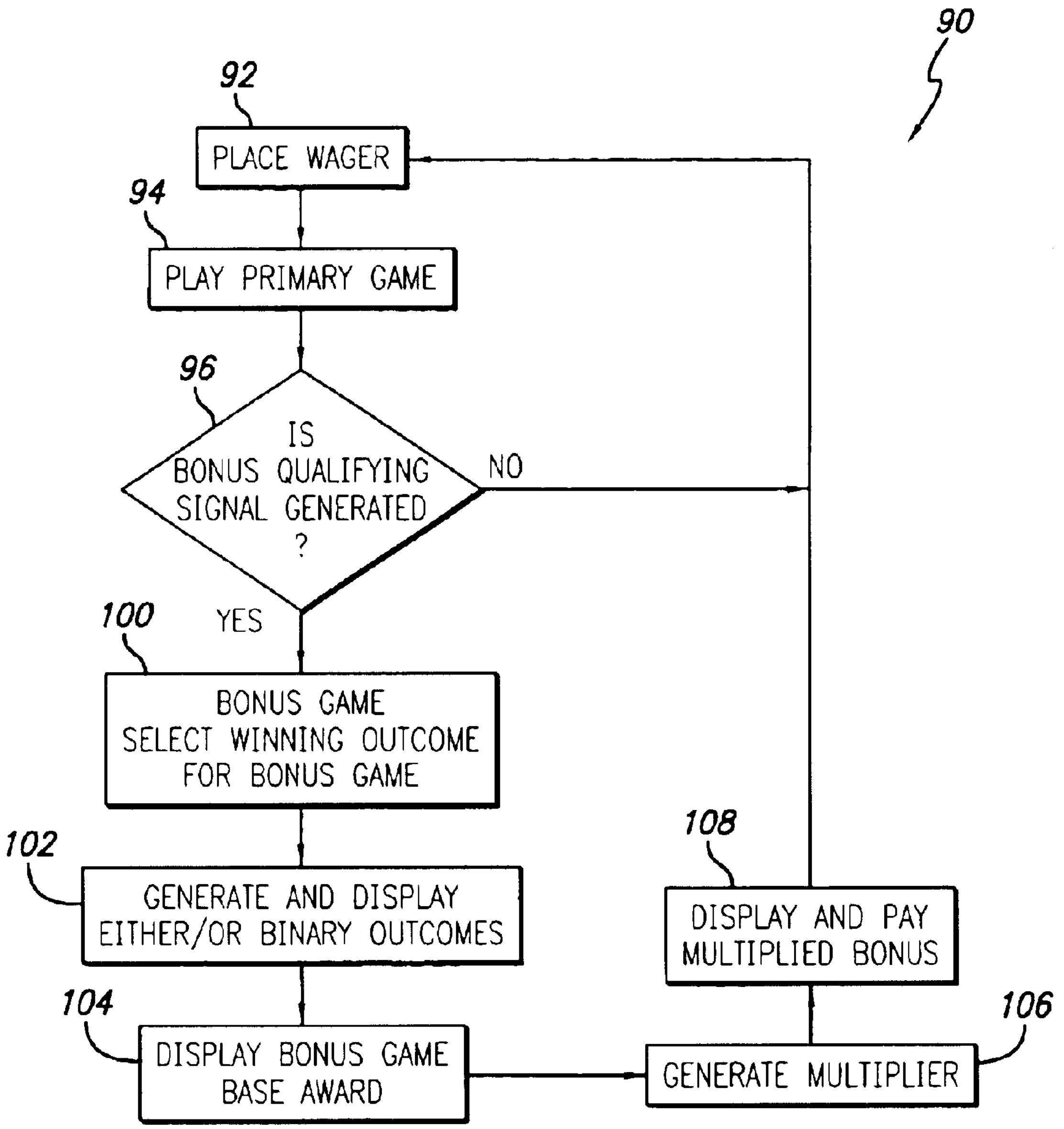
FIG. 7 is substantially a flowchart of an alternative embodiment of the bonus gaming method.

Referring to FIG. 7, a detailed flowchart 90 of another embodiment of the bonus gaming method is shown. A game player initiates game play at step 92 by depositing coins or tokens into primary game 14. The game player plays a game on the primary game at step 94. The primary game 14 generates a bonus-qualifying event 16. At decision step 96, the game checks to see if the bonus-qualifying event is generated. If the bonus-qualifying event is not generated, the game loops back to step 92 to allow the player the opportunity to place another wager and play the primary game again. If the bonus-qualifying event is generated at step 96, the game proceeds to step 100. At step 100, the player is queried to select one of the either/or binary outcomes. Next, at step 102, the bonus game generates and displays the three either/or binary heads or tails outcomes. Next, at step 104, the base bonus award is displayed. The game then proceeds to step 106 where a multiplier is generated. Next, at step 108, the base bonus is multiplied by the multiplier, displayed and paid. The base bonus depends upon the number of similar binary outcomes displayed, which would be referenced in a payout table.

Figure 8:
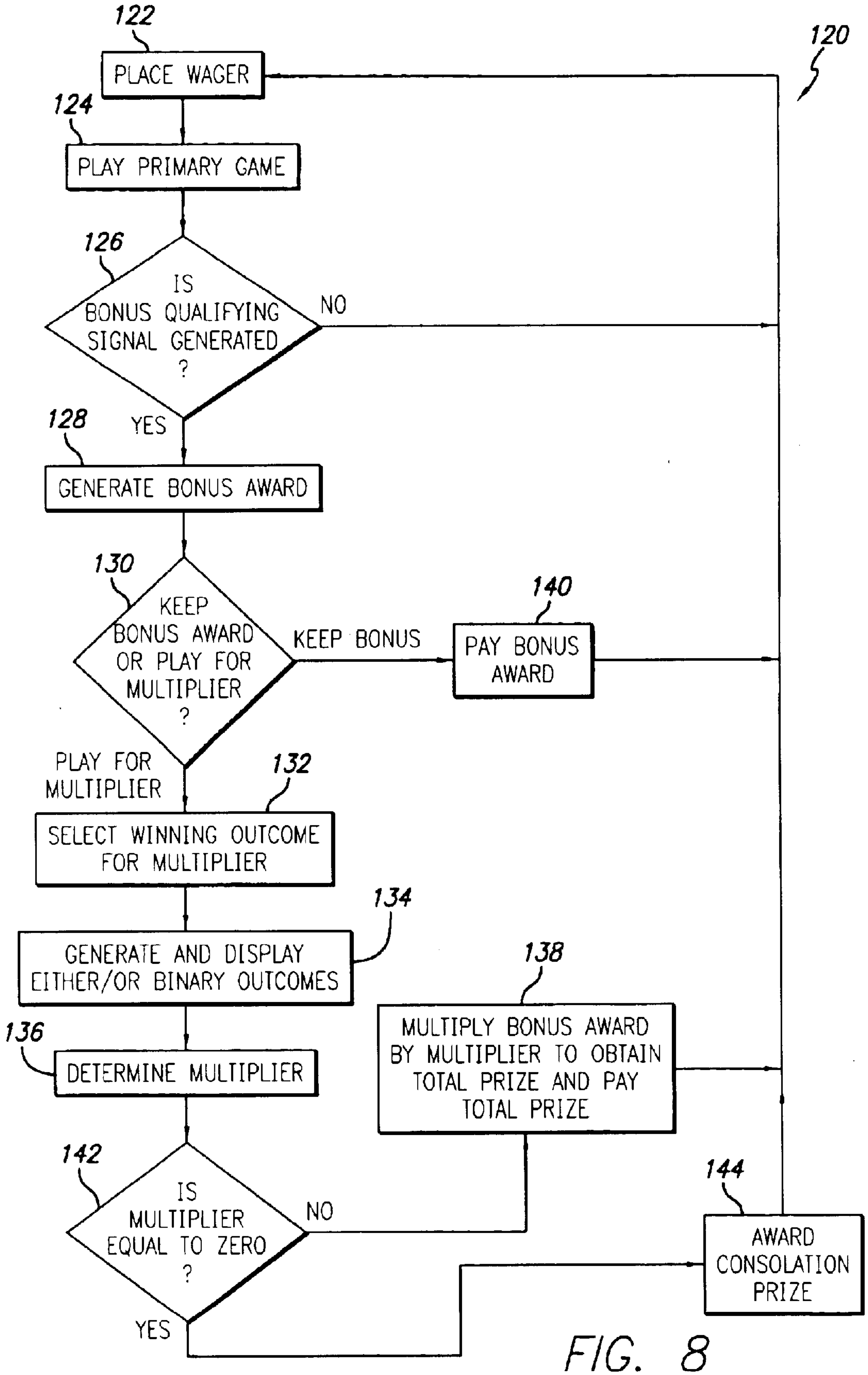
FIG. 8 is substantially a flowchart of another embodiment of the bonus gaming method.

Referring to FIG. 8, a detailed flowchart 120 of another embodiment of the bonus gaming method is shown. A game player initiates game play at step 122 by depositing coins or tokens into primary game 14. The game player plays a game on the primary game at step 124. The primary game 14 generates a bonus-qualifying event 16. At decision step 126, the game checks to see if the bonus-qualifying event is generated. If the bonus-qualifying event is not generated, the game loops back to step 122 to allow the player the opportunity to place another wager and play the primary game again. If the bonus-qualifying event is generated at step 126, the game proceeds to step 128 where a bonus award is selected. At step 130, the player decides whether to keep the bonus award or to play for a multiplier to be multiplied by the bonus award to provide another total prize. If the player decides to keep the bonus award, the game proceeds to step 140 where the bonus award is paid. If the player decides to play for a multiplier, the game proceeds to step 132 where the player is queried to select one of the either/or binary outcomes as a winning outcome. Next, at step 134, the bonus game generates and displays the either/or binary heads or tails outcomes. Preferably three coins are used, however, 1, 2 or more than 3 could be used. Next, at step 136, the multiplier is determined; the multiplier is proportional to the number of correct heads or tails that match the player's selection. For example, if the player selected heads and one coin 18 resulted in a head, the multiplier could be one. At step 142, the multiplier is compared to see if it is equal to zero. If the multiplier is equal to zero, the game proceeds to step 144 where a consolation prize is awarded to the game player. The game then returns to step 122 to allow the player to play the primary game again. If the multiplier is not equal to zero, the game proceeds to step 138. At step 138, the bonus award is multiplied by the multiplier to obtain a total prize and is displayed and paid. The game then returns to step 122 to place another wager.

Figure 9:
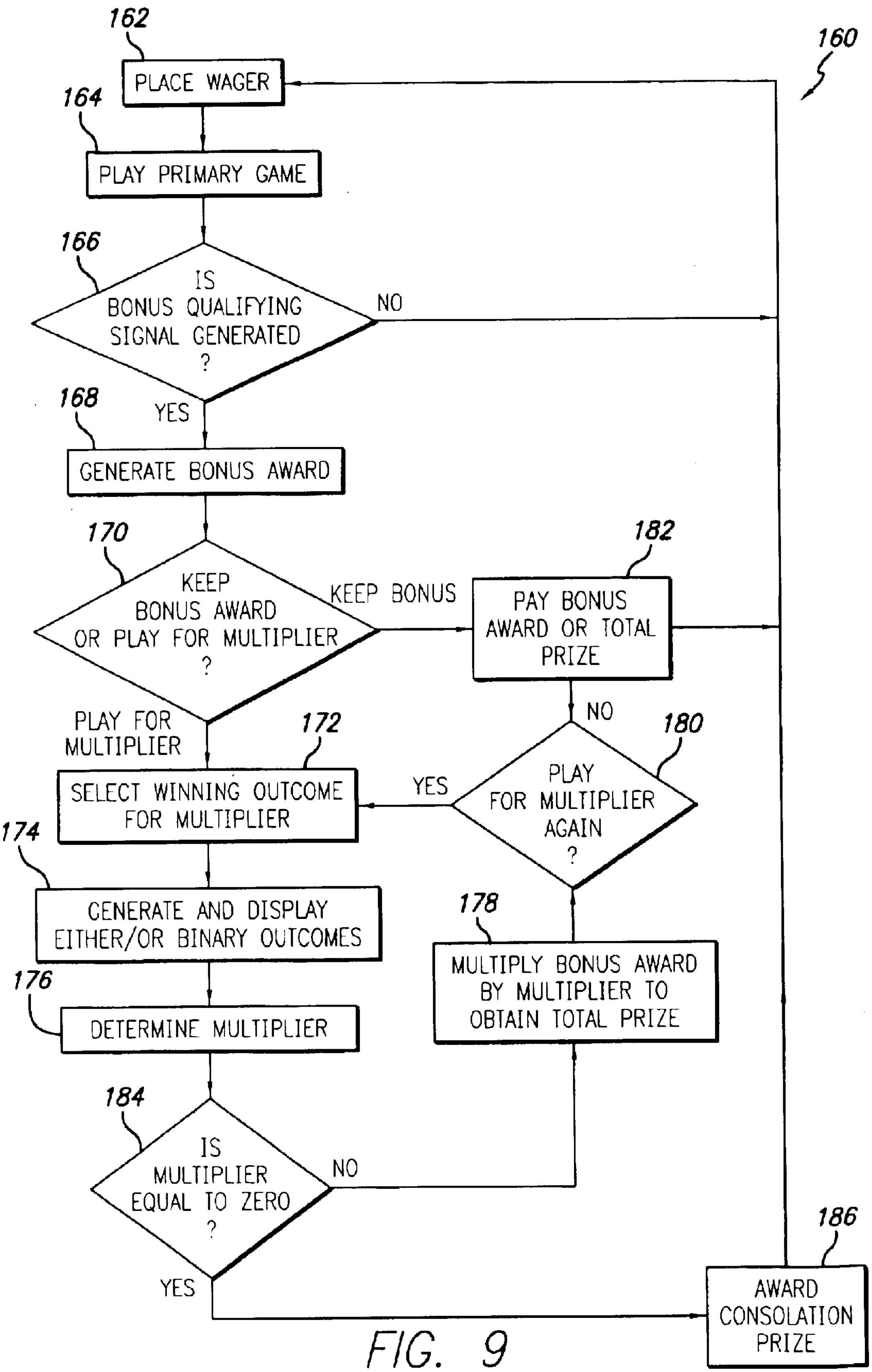
FIG. 9 is substantially a flowchart of another embodiment of the bonus gaming method.

Referring to FIG. 9, a detailed flowchart 160 of another embodiment of the bonus gaming method is shown. A game player initiates game play at step 162 by depositing coins or tokens into primary game 14. The game player plays a game on the primary game at step 164. The primary game 14 generates a bonus-qualifying event 16. At decision step 166, the game checks to see if the bonus-qualifying event is generated. If the bonus-qualifying event is not generated, the game loops back to step 162 to allow the player the opportunity to place another wager and play the primary game again. If the bonus-qualifying event is generated at step 166, the game proceeds to step 168 where a bonus award is selected. At step 170, the player decides whether to keep the bonus award or to play for a multiplier to be multiplied by the bonus award to provide another total prize. If the player decides to keep the bonus award, the game proceeds to step 182 where the bonus award is paid. The game then returns to the place wager at step 162. If the player decides to play for a multiplier, the game proceeds to step 172 where the player is queried to select one of the either/or binary outcomes as a winning outcome. Next, at step 174, the bonus game generates and displays the either/or binary heads or tails outcomes. Preferably three coins are used, however, 1, 2 or more than 3 could be used. Next, at step 176, the multiplier is determined; the multiplier is proportional to the number of correct heads or tails that match the player's selection. For example, if the player selected heads and one coin 18 resulted in a head, the multiplier could be one. At step 184, the multiplier is compared to see if it is equal to zero. If the multiplier is equal to zero, the game proceeds to step 186 where a consolation prize is awarded to the game player. The game then returns to step 162 to allow the player to play the primary game again. If the multiplier is not equal to zero, the game proceeds to step 178.

Next, at step 178, the bonus award is multiplied by the multiplier to obtain a total prize and is displayed. The game then proceeds to decision step 180, where the game player is allowed to choose between playing for a multiplier again or to accept the total prize. If the player decides to keep the total prize, the game proceeds to step 182 where the total prize is paid. The game then returns to the place wager at step 162. If the player decides to play again for a multiplier, the game proceeds to step 172 where the player is queried to select one of the either/or binary outcomes as a winning outcome and steps 174, 176, 178 and 180 are repeated.

Figure 10:
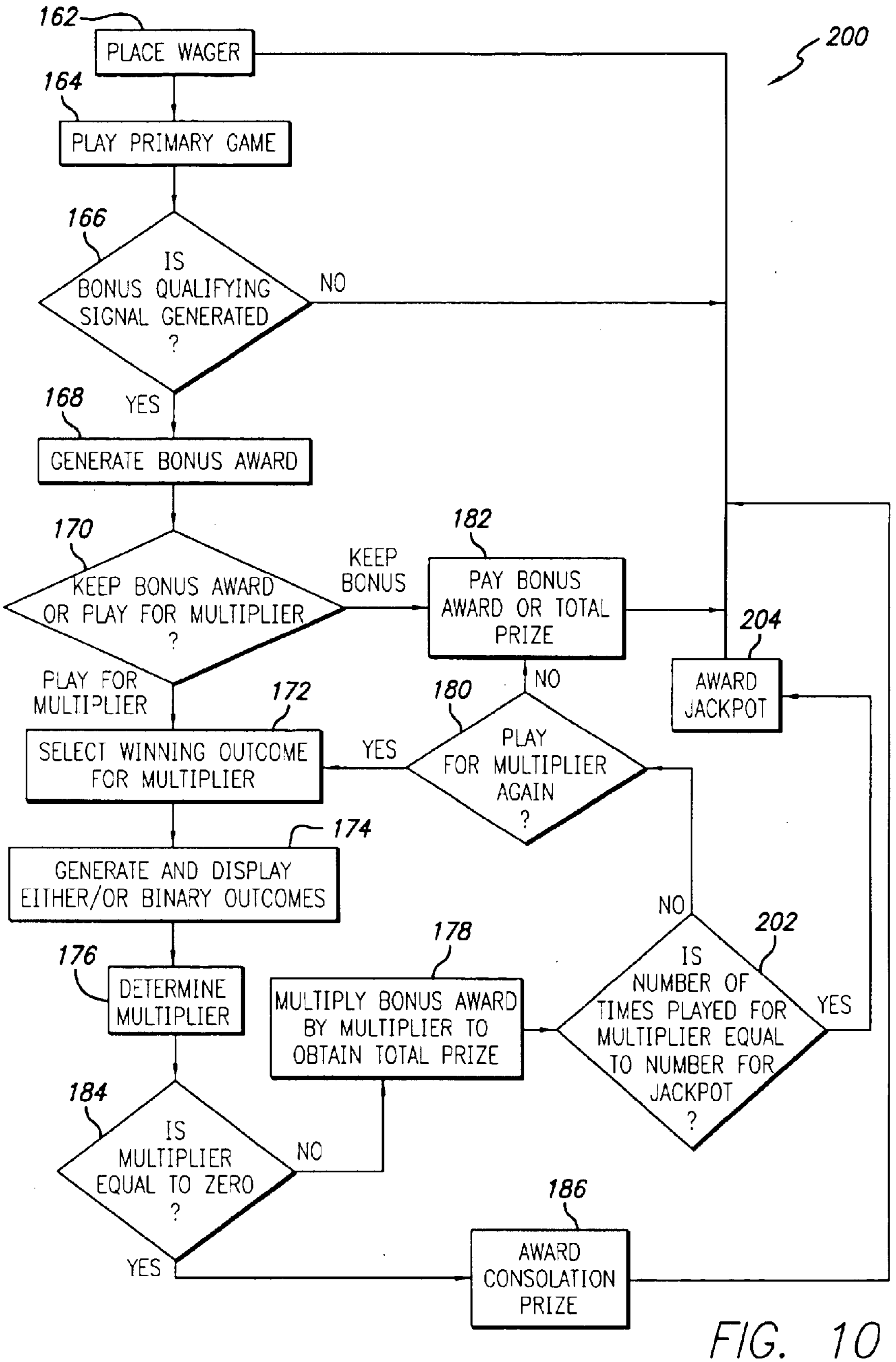
FIG. 10 is substantially a flowchart of another embodiment of the bonus gaming method.

Referring to FIG. 10, a detailed flowchart 200 of another embodiment of the bonus gaming method is shown. Flowchart 200 allows a game player to replay for the multiplier. If the player correctly repeats playing for a multiplier a predetermined number of times, the player is awarded a progressive jackpot. A game player initiates game play at step 162 by depositing coins or tokens into primary game 14. The game player plays a game on the primary game at step 164. The primary game 14 generates a bonus-qualifying event 16. At decision step 166, the game checks to see if the bonus-qualifying event is generated. If the bonus-qualifying event is not generated, the game loops back to step 162 to allow the player the opportunity to place another wager and play the primary game again. If the bonus-qualifying event is generated at step 166, the game proceeds to step 168 where a bonus award is selected.

At step 170, the player decides whether to keep the bonus award or to play for a multiplier to be multiplied by the bonus award to provide another total prize. If the player decides to keep the bonus award, the game proceeds to step 182 where the bonus award is paid. The game then returns to the place wager at step 162. If the player decides to play for a multiplier, the game proceeds to step 172 where the player is queried to select one of the either/or binary outcomes as a winning outcome. Next, at step 174, the bonus game generates and displays the either/or binary heads or tails outcomes. Preferably three coins are used, however, 1, 2 or more than 3 could be used. Next, at step 176, the multiplier is determined. The multiplier is proportional to the number of correct heads or tails that match the player's selection. For example, if the player selected heads and one coin 18 resulted in a head, the multiplier could be one. At step 184, the multiplier is compared to see if it is equal to zero. If the multiplier is equal to zero, the game proceeds to step 186 where a consolation prize is awarded to the game player. The game then returns to step 162 to allow the player to play the primary game again. If the multiplier is not equal to zero, the game proceeds to step 178.

Next, at step 178, the bonus award is multiplied by the multiplier to obtain a total prize and is displayed. The game then proceeds to decision step 202. At decision step 202 the number of times that the multiplier has been played for is compared to a predetermined number. If the number of times that the multiplier has been played is equal to the predetermined number, the game proceeds to step 204 where a progressive jackpot is awarded. The jackpot won is shown on total prize meter 54. The game then returns to step 162. If the number of times that the multiplier has been played is not equal to the predetermined number, the game proceeds to step 180. At decision step 180, the game player is allowed to choose between playing for the multiplier again or to accept the total prize. If the player decides to keep the total prize, the game proceeds to step 182 where the total prize is paid. The game then returns to the place wager at step 162. If the player decides to play again for a multiplier, the game proceeds to step 172 where the player is queried to select one of the either/or binary outcomes as a winning outcome and steps 174, 176, 178, 180 and 202 are repeated. The progressive jackpot can be linked to the correct number of binary outcomes selected by the player during the multiplier bonus rounds.

Conclusion

The present invention solves many of the problems associated with the prior art. The present invention provides a gaming device that generates player interest and excitement resulting in longer game play. The present invention provides a method of playing a bonus game that is visually appealing and that holds the attention of game players. The present invention provides a bonus gaming device that is easily added to a primary game.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A bonus gaming device for playing a bonus game by a player, comprising:

(A) a primary game that randomly generates a bonus qualifying event;

(B) a bonus game communicated with the primary game, the bonus game being configured to generate a plurality of outcomes based on two possible symbols;

(C) a selector button communicated with the bonus game, the selector button being configured to allow the player to select at least one of the symbols as a winning outcome; and (D) the bonus game displaying the symbols and calculating a payout based upon the number of outcomes that match the symbol selected by the player.

2. The gaming device according to claim 1, wherein a multiplier random number generator selects a multiplier to increase the pay out to be awarded.

3. The gaming device according to claim 1, wherein the bonus game automatically selects a winning outcome.

4. The gaming device according to claim 1, wherein the plurality of outcomes are determined by three spinning coins each having a head side and a tail side.

5. The gaming device according to claim 4, wherein the three spinning coins are displayed on a video screen.

6. The gaming device according to claim 1, further comprising a changing sign display to entertain the player during the bonus game.

7. The gaming device according to claim 6, wherein the changing sign display is a quarter.

8. A method of playing a bonus game comprising:

(A) allowing a player to play a primary game;

(B) generating a bonus qualifying event, the primary game generating the bonus qualifying event;

(C) starting a bonus game in response to the bonus qualifying event, the bonus game communicated with the primary game;

(D) selecting one of two possible symbols as a winning outcome;

(E) generating a plurality of outcomes based on the two possible symbols;

(F) displaying the plurality of outcomes; and (G) determining a payout based upon the selected winning outcome.

9. The method of playing a bonus game according to claim 8, wherein the plurality of outcomes based on two possible symbols are determined by three spinning coins each having a head side and a tail side.

10. The method of playing a bonus game according to claim 9, wherein the three spinning coins are displayed on a video screen.

11. The method of playing a bonus game according to claim 8, further comprising: selecting a multiplier to increase the pay out to be awarded.

12. The method of playing a bonus game according to claim 8, further comprising a changing sign display to entertain the player during the bonus game.

13. The gaming device according to claim 12, wherein the changing sign display is a quarter.

14. The gaming device according to claim 8, wherein the outcomes are generated by a secondary random number generator.

15. The gaming device according to claim 11, wherein the multiplier is generated by a multiplier random generator.

16. A bonus gaming device for playing a bonus game by a player, comprising:

(A) a primary gaming device, the primary gaming device being configured to allow a player to play a game;

(B) a bonus gaming device, the bonus gaming device being configured to generate a plurality of outcomes based on the display of one of two possible symbols, the bonus gaming device being configured to award a prize based upon the number of outcomes that match a winning outcome;

(C) an input device in communication with the bonus gaming device, the input device being configured to allow the player to select at least one of the two possible symbols as determining a winning outcome; and (D) a display configured to display the outcomes.

17. The gaming device according to claim 16, wherein the plurality of outcomes are determined by three spinning coins each having a head side and a tail side.

18. The gaming device according to claim 16, wherein the prize is multiplied by a multiplier.

19. A method of playing a game by a player, the method comprising:

(A) allowing the player to play the game, the game awarding a prize to the player;

(B) allowing the player to select between receiving the prize or multiplying the prize by an unknown multiplier to obtain a second prize;

(C) awarding the prize to the player, if the player selects to receive the prize;

(D) allowing the player to select one of two possible symbols resulting in a player selected binary outcome, if the player selects to multiply the prize by the unknown multiplier;

(E) determining at least one outcome based on the display of one of the two possible symbols;

(F) displaying the outcome to the player;

(G) determining the multiplier, the multiplier being proportional to the number of outcomes matching the symbol the player selected;

(H) multiplying the prize by a multiplier to obtain the second prize; and (I) awarding the second prize to the player.

20. The method of playing a game according to claim 19 wherein after the second prize has been awarded, the player is allowed to repeat selecting between receiving the second prize or multiplying the second prize by an unknown multiplier to obtain a third prize.

21. The method of playing a game according to claim 19 further comprising allowing the player to select between receiving the second prize or multiplying the second prize by an unknown multiplier to obtain another prize.

22. The gaming bonus method according to claim 19, wherein a consolation prize is awarded if the multiplier is equal to zero.

23. The gaming bonus method according to claim 20 wherein a progressive jackpot is awarded if the player repeats the selection for the multiplier a predetermined number of times.

24. The gaming bonus method according to claim 23 wherein the amount of the progressive jackpot is proportional to the number of outcomes matching the symbol selected by the player.

25. A method of playing a game by a player, the method comprising:

(a) allowing the player to play a game, the game awarding a prize to the player;

(b) allowing the player to select between receiving the prize or multiplying the prize by an unknown multiplier to obtain a second prize;

(c) awarding the prize to the player, if the player selects to receive the prize;

(d) allowing the player to select one of two possible symbols resulting in a player selected outcome, if the player selects to multiply the prize by the unknown multiplier;

(e) determining at least one outcome based on the display of one of the two possible symbols;

(f) displaying the outcome to the player;

(g) determining the multiplier, the multiplier being equal to a first predefined number if the outcome is the same as the selected symbol, the multiplier being equal to a second predefined number if the outcome is different than the selected symbol;

(h) multiplying the prize by the first or second predefined number to obtain the second prize; and (i) awarding the second prize to the player.

26. The method of playing a game according to claim 25 wherein after the second prize has been awarded, the player is allowed to repeat selecting between receiving the second prize or multiplying the second prize by an unknown multiplier to obtain a third prize.

27. The method of playing a game according to claim 25 further comprising allowing the player to select between receiving the second prize or multiplying the second prize by an unknown multiplier to obtain another prize.

28. The gaming bonus method according to claim 25, wherein a consolation prize is awarded if the multiplier is equal to zero.

29. The gaming bonus method according to claim 25 wherein a progressive jackpot is awarded if the player repeats the selection for the multiplier a predetermined number of times.

30. The gaming bonus method according to claim 29 wherein the amount of the progressive jackpot is proportional to the number of outcomes matching the symbol selected by the player.

31. A gaming bonus device for use in a gaming system, comprising:

a. a primary gaming device randomly generating a bonus qualifying event; and b. a bonus game acting in response to the bonus qualifying event, which generates and displays an outcome based on the display of one of two possible symbols, the bonus game allowing a player to select a winning symbol, the bonus game awarding a prize to the player when the outcome matches the symbol selected by the player.

32. The gaming bonus device according to claim 31, wherein the outcome is determined by a spinning coin having a head and a tail side.

33. The gaming bonus device according to claim 31, wherein the bonus game generates a bonus in response to the bonus qualifying event, the bonus game further generating a multiplier when the outcome matches the symbol selected by the player.

34. The gaming bonus device according to claim 33, wherein the prize is equal to the bonus multiplied by the multiplier.

35. The gaming bonus method according to claim 33, wherein a consolation prize is awarded if the multiplier is equal to zero.

36. A gaming bonus method for use in a gaming system comprising:

(A) allowing a player to play a game;

(B) producing a predefined bonus qualifying event;

(C) allowing the player to select one of two possible symbols; and (D) activating a bonus game acting in response to the bonus qualifying event to generate and display at least one outcome based on the two possible symbols.

37. The gaming bonus method according to claim 36, further comprising generating a multiplier when the symbol selected by the player matches the outcome.

38. The gaming bonus method according to claim 37, further comprising multiplying the multiplier by a bonus to obtain a total prize.

39. The gaming bonus method according to claim 38, further comprising awarding the total prize.

40. The gaming bonus method according to claim 38 wherein a consolation prize is awarded if the multiplier is equal to zero.

* * * * *